(12) United States Patent
Ghimire

(10) Patent No.: US 9,398,174 B2
(45) Date of Patent: Jul. 19, 2016

(54) COMMUNICATION APPARATUS HAVING AN OPERATIONAL-SIGNAL CUT-OFF SECTION TO PREVENT A NETWORK-EVENT DETECTOR FROM OUTPUTTING AN OPERATIONAL SIGNAL

(71) Applicant: BROTHER KOGYO KABUSHIKI KAISHA, Nagoya-shi, Aichi-ken (JP)

(72) Inventor: Jagatjyoti Ghimire, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 199 days.

(21) Appl. No.: 14/193,751

(22) Filed: Feb. 28, 2014

(65) Prior Publication Data

US 2014/0240744 A1    Aug. 28, 2014

(30) Foreign Application Priority Data

Feb. 28, 2013   (JP) ................. 2013-039582

(51) Int. Cl.
| | |
|---|---|
| G06F 1/32 | (2006.01) |
| G06F 1/00 | (2006.01) |
| G06F 3/12 | (2006.01) |
| H04N 1/00 | (2006.01) |

(52) U.S. Cl.
CPC ....... *H04N 1/00127* (2013.01); *H04N 1/00167* (2013.01); *H04N 1/00188* (2013.01)

(58) Field of Classification Search
CPC ..................................... G06F 1/3203
USPC ........................................ 713/320
See application file for complete search history.

(56) References Cited

U.S. PATENT DOCUMENTS 5,848,281 A * 12/1998 Smalley et al. ............ 713/322
8,593,672 B2 * 11/2013 Aoyama et al. ............ 358/1.15

(Continued)

FOREIGN PATENT DOCUMENTS

| EP | 1 057 652 A2 | 12/2000 |
|---|---|---|
| JP | 2001-045678 A | 2/2001 |

(Continued)

OTHER PUBLICATIONS

United States Official Action dated Mar. 24, 2016 received in related U.S. Appl. No. 14/317,620.

(Continued)

*Primary Examiner* — Suresh Suryawanshi
(74) *Attorney, Agent, or Firm* — Scully, Scott, Murphy & Presser, P.C.

(57) ABSTRACT

A network connecting section is configured to operate by using operational power and connected to the telephone network to perform transmission and reception of signals with the telephone network. A main power supply is configured to supply a supply target including the network connecting section with the operational power. A network-event detector is configured to detect an electrical change in the telephone network as a network event. A normal-mode setter is configured to set an operational mode to a normal mode when the network-event detector detects the network event in a state where the operational mode is in a stopped mode. The normal mode is the operational mode in which the operational power is supplied from the main power supply to the network connecting section. The stopped mode is the operational mode in which supply of the operational power to the network connecting section is stopped.

9 Claims, 3 Drawing Sheets

(56) References Cited

U.S. PATENT DOCUMENTS

| | | | |
|---|---|---|---|
| 8,718,248 B2* | 5/2014 | Baba | 379/100.01 |
| 8,898,490 B2* | 11/2014 | Koga | 713/300 |
| 2007/0070384 A1* | 3/2007 | Jeon | 358/1.14 |
| 2007/0201049 A1 | 8/2007 | Semma et al. | |
| 2009/0195211 A1 | 8/2009 | Wang et al. | |
| 2011/0235083 A1* | 9/2011 | Suzuki | 358/1.14 |
| 2012/0290853 A1 | 11/2012 | He et al. | |
| 2013/0159736 A1* | 6/2013 | Yanagawa | 713/300 |
| 2013/0283071 A1 | 10/2013 | Ushiro | |
| 2014/0164795 A1 | 6/2014 | Wright et al. | |
| 2015/0180257 A1 | 6/2015 | Snyder et al. | |

FOREIGN PATENT DOCUMENTS

| | | | |
|---|---|---|---|
| JP | 2002-232590 A | | 8/2002 |
| JP | 2005-57500 A | | 3/2005 |
| JP | 2006108820 A | * | 4/2006 |

OTHER PUBLICATIONS

Japanese Official Action dated May 10, 2016 received in related application JP 2013-039582 together with an English language translation.

* cited by examiner

COMMUNICATION APPARATUS HAVING AN OPERATIONAL-SIGNAL CUT-OFF SECTION TO PREVENT A NETWORK-EVENT DETECTOR FROM OUTPUTTING AN OPERATIONAL SIGNAL

CROSS REFERENCE TO RELATED APPLICATIONS

This application claims priority from Japanese Patent Application No. 2013-039582 filed Feb. 28, 2013. The entire content of the priority application is incorporated herein by reference.

TECHNICAL FIELD

The invention relates to a communication apparatus that is connectable to a telephone network.

BACKGROUND

There are various types of communication apparatuses having functions of performing communication through a telephone network (a switch board and so on) such as a telephone function and a facsimile function (hereinafter referred to as "telephone-network communication function"). For example, there are single-use machines having the telephone-network communication function, as well as so-called multifunction peripherals having a print function and a copy function in addition to the telephone-network communication function.

These communication apparatuses generally have a main power-supply circuit for supplying various units in the apparatus with electric power. For example, in a multifunction peripheral, when a power switch is turned on, the main power-supply circuit supplies electric power to various units in the apparatus, such as a print mechanism, a copy mechanism, various communication circuits such as a DAA (Data Access Arrangement) and a modem, and a control circuit that controls operations of these mechanisms, thereby making the various units in the apparatus in operable states.

Recently, for reducing power consumption, various electrical equipment including communication apparatuses is provided with, as operational modes, a normal mode in which the main power-supply circuit supplies various units with electric power (or a state in which electric power can be supplied) and a sleep mode in which power supply from the main power-supply circuit is stopped except that micro power is supplied to a requisite minimum circuit such as a control circuit.

SUMMARY

Although power saving can be achieved by having the sleep mode as an operational mode, a demand for reducing power consumption is increasing year by year and hence further power saving is expected. As one method for further reducing power consumption than the sleep mode, it is conceivable to provide a mode of completely stopping power supply from a main power-supply circuit (hereinafter referred to as "OFF mode").

In the OFF mode, power supply to the control circuit and various communication circuits is cut off, and the operations stop completely. In the OFF mode, however, the operations of only minimum functions such as ON/OFF detection of a power switch, RTC (Real Time Clock), OFF-mode cancel condition detection, and an activate request to a main power-supply circuit are continued with a backup power supply such as a secondary battery and a supercapacitor. Hence, in the OFF mode, a power saving effect better than the sleep mode can be obtained, while maintaining minimum functions.

If a communication apparatus having a telephone-network communication function is provided with the OFF mode as an operational mode, a good power saving effect can be obtained. However, because the operations of various communication circuits such a DAA and a modem are stopped in the OFF mode, various events from the telephone network side such as call signals and polarity reversion cannot be detected.

Hence, in the communication apparatus having the telephone-network communication function, it is not realistic to set the operational mode to the OFF mode in order to operate with incoming telephone calls corresponding to telephone-network communication function.

In view of the foregoing, the invention provides a communication apparatus connectable to a telephone network. The communication apparatus includes a network connecting section, a main power supply, a network-event detector, and a normal-mode setter. The network connecting section is configured to operate by using operational power and connected to the telephone network to perform transmission and reception of signals with the telephone network. The main power supply is configured to supply a supply target including the network connecting section with the operational power. The network-event detector is configured to detect an electrical change in the telephone network as a network event. The normal-mode setter is configured to set an operational mode to a normal mode when the network-event detector detects the network event in a state where the operational mode is in a stopped mode. The normal mode is the operational mode in which the operational power is supplied from the main power supply to the network connecting section. The stopped mode is the operational mode in which supply of the operational power to the network connecting section is stopped.

BRIEF DESCRIPTION OF THE DRAWINGS

Embodiments in accordance with the invention will be described in detail with reference to the following figures wherein.

DETAILED DESCRIPTION

An embodiment of the invention will be described while referring to FIGS. 1 through 3.

Figure 1:
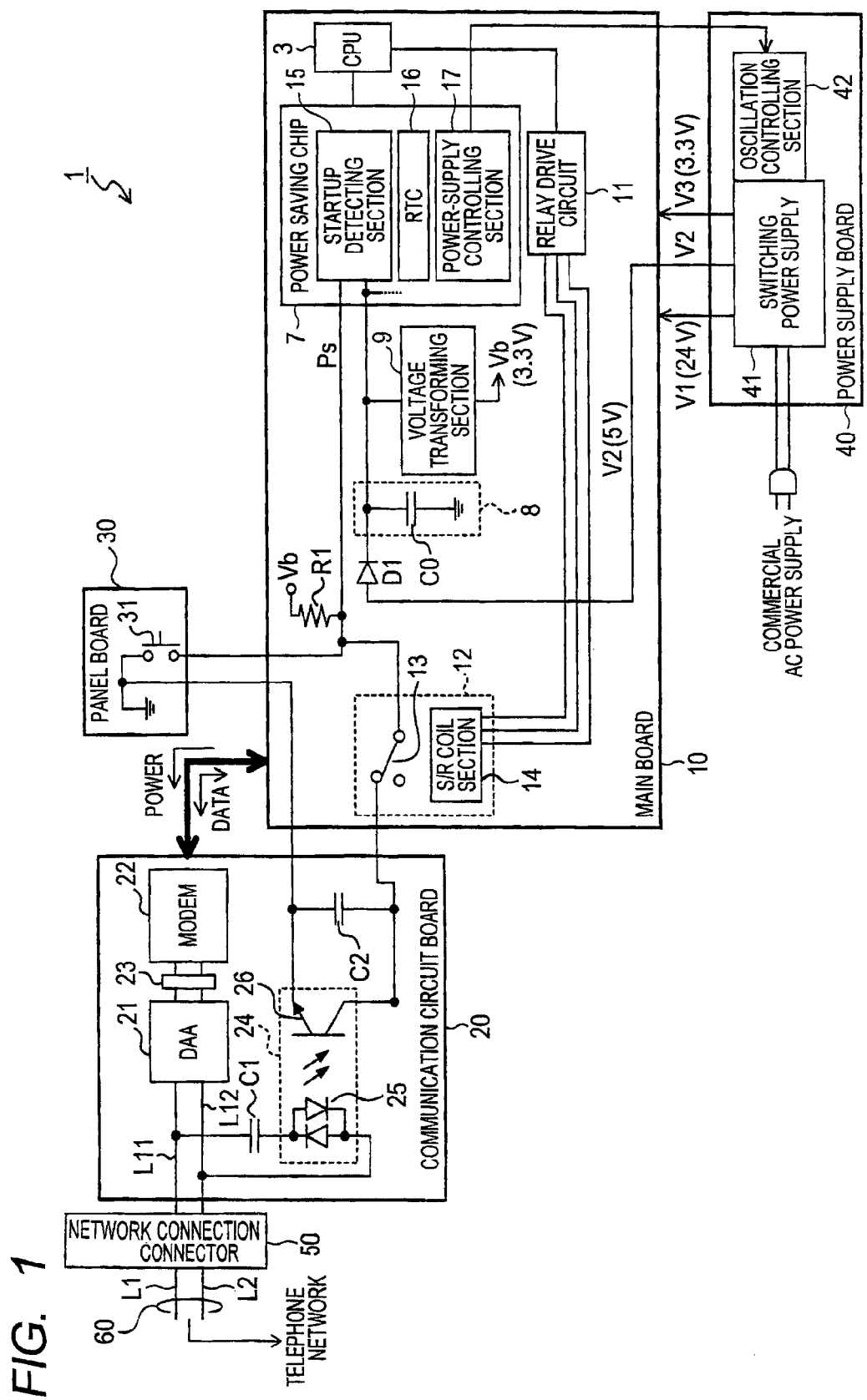
FIG. 1 is a diagram showing the overall configuration of a multifunction peripheral according to an embodiment.

As shown in FIG. 1, a multifunction peripheral 1 of the embodiment has a plurality of functions such as a voice telephone call function, a facsimile communication function, a copy function, a scanner function, and so on. The multifunction peripheral 1 includes a main board 10, a communication circuit board 20, a panel board 30, a power supply board 40, and a network connection connector (telephone-network connection connector) 50. In addition to the configuration shown in FIG. 1, the multifunction peripheral 1 includes a print mechanism that performs printing, an image reading mechanism that reads an image of an original document, and the like, which are not shown in the drawing.

The power supply board 40 includes a switching power supply 41 and an oscillation controlling section 42. The switching power supply 41 steps down commercial AC power inputted from the outside (for example, AC 100V power) to a plurality of kinds of DC power-supply voltages, and outputs the DC voltages to the main board 10 and other necessary circuits, mechanisms, and the like. In the present embodiment, the switching power supply 41 generates a first DC power-supply voltage V1 of 24V, a second DC power-supply voltage V2 of 5V, and a third DC power-supply voltage V3 of 3.3V, and outputs these voltages to the main board 10 and the like.

Note that the third DC power-supply voltage V3 generated by the switching power supply 41 is supplied to the communication circuit board 20 via the main board 10. However, the third DC power-supply voltage V3 may be supplied to the communication circuit board 20 directly from the switching power supply 41.

The oscillation controlling section 42 oscillates or stops the switching power supply 41 based on a power-supply oscillation stop/start pulse signal inputted from the main board 10. Here, a term "oscillate" used for the switching power supply 41 means an operation of stepping down commercial AC power to each DC power-supply voltage V1, V2, and V3 and of outputting these voltages.

The oscillation controlling section 42 stops oscillating of the switching power supply 41 if the power-supply oscillation stop/start pulse signal is inputted from the main board 10 when the switching power supply 41 is oscillating, and starts oscillating of the switching power supply 41 if the power-supply oscillation stop/start pulse signal is inputted from the main board 10 when the switching power supply 41 is stopped.

The panel board 30 includes a power button switch 31 that is operated by a user for turning on/off the operation of the multifunction peripheral 1. One end of the power button switch 31 is connected to one end of a resistance R1 in the main board 10, while the other end of the power button switch 31 is connected to a ground line.

The power button switch 31 is a so-called self-returning switch that closes contacts and turns on only while the user is pressing. That is, when the user presses the power button switch 31, the contacts are closed and the switch turns on so that the one end of the resistance R1 is electrically connected to the ground line via the power button switch 31. When the user releases the power button switch 31, the contacts are opened and the switch turns off so that a path between the one end of the resistance R1 and the ground line is cut off.

The communication circuit board 20 includes a DAA 21, a modem 22, a transformer 23, and a photo coupler 24. The DAA 21 is connected to a public telephone network via a line cord 60. The line cord 60 is a cable for connecting the multifunction peripheral 1 to the telephone network, and includes a pair of telephone cables L1 and L2. When the line cord 60 is connected to the network connection connector 50, the pair of telephone cables L1 and L2 of the line cord 60 is connected to respective ones of a pair of network connection lines (telephone-network connection lines) L11 and L12 in the communication circuit board 20, so that a state is achieved in which the telephone network is connected to the DAA 21.

The DAA 21 is a well-known network connection module that is used as an interface for connection to an analog telephone network. In accordance with various commands inputted from the CPU 3 in the main board 10 via the modem 22, the DAA 21 performs closing and opening of the telephone network, detection of various input signals from the telephone network (for example, call signal, dial tone, polarity reversion and so on), transmission of various output signals to the telephone network, and the like.

The DAA 21 is connected to the modem 22 via the transformer 23 for galvanically isolating the primary side (the DAA 21 and the network connection connector 50 side) from the secondary side (the modem 22 side) in the multifunction peripheral 1. The operational power of the DAA 21 is supplied from the modem 22 via the transformer 23. Also, input and output of various signals between the DAA 21 and the modem 22 are performed via the transformer 23.

The modem 22 has a basic function of modulating or demodulating of facsimile signals that are transmitted or received in facsimile communication and, in addition to that, controls the DAA 21 in accordance with commands from the CPU 3 of the main board 10, and performs output of various signals to the DAA 21 and reception of various input signals, line voltages, from the DAA 21.

The photo coupler 24 includes a light emitting diode unit 25 and a photo transistor 26. The light emitting diode unit 25 includes two light emitting diodes that are connected in parallel in the opposite directions from each other. One end of the light emitting diode unit 25 is connected to one network connection line L11 via a capacitor C1, and the other end of the light emitting diode unit 25 is connected to the other network connection line L12.

Hence, when an electrical change (a change in voltage between the pair of telephone cables L1 and L2) occurs in the telephone network, that is, for example, when polarity reversion occurs or a call signal is outputted, one of the two light emitting diodes constituting the light emitting diode unit 25 emits light and the photo transistor 26 turns on while the light emitting diode is emitting light.

One end (emitter) of the photo transistor 26 is connected to the other end of the power button switch 31 in the panel board 30 (that is, connected to the ground line). The other end (collector) of the photo transistor 26 is connected to one end of the resistance R1 (that is, connected to one end of the power button switch 31) via a latching relay 12 in the main board 10. That is, the power button switch 31 is connected in parallel to a circuit in which the photo transistor 26 and the latching relay 12 are connected in series. Note that a capacitor C2 is connected between the emitter and the collector of the photo transistor 26.

The latching relay 12 includes a switch 13 and a set (S)/reset (R) coil section 14 that drives the switch 13. The switch 13 includes one common terminal and two contacts. The common terminal is connected to one end of the resistance R1 (that is, connected to one end of the power button switch 31). One of the two contacts is connected to the other end (collector) of the photo transistor 26. The contact connected to the other end of the photo transistor 26 will be also hereinafter referred to as "coupler-side contact".

The switch 13 of the latching relay 12 switches between the contacts each time a pulse is inputted to the S/R coil section 14. FIG. 1 shows a state in which the switch 13 is switched to the coupler-side contact so that the common terminal is electrically connected to the coupler-side contact. This state is referred to as "set state" in the present embodiment. Conversely, a state in which the switch 13 is switched to the other contact (different from the coupler-side contact) is referred to as "reset state".

The latching relay 12 is a relay that requires energization (pulse input) to the S/R coil section 14 only at the time of switching of the switch 13 and that does not require constant energization for keeping a state after switching. That is, when a setting pulse is inputted to the S/R coil section 14 in the reset state of the switch 13, the switch 13 is set (that is, switched to the set state). When a resetting pulse is inputted to the S/R coil section 14 in the set state of the switch 13, the switch 13 is reset (that is, switched to the reset state). That is, each time a pulse is inputted to the S/R coil section 14, the set/reset state of the switch 13 is switched. After the state of the switch 13 is switched due to a pulse input to the S/R coil section 14, the S/R coil section 14 is in a non-energized state until a pulse is inputted again, but the switched state is maintained.

Next, the main board 10 will be described. The main board 10 includes the CPU 3, a power saving chip 7, a backup power supply 8, a voltage transforming section 9, a relay drive circuit 11, the latching relay 12, the resistance R1, and the like.

The CPU 3 performs various control processes for realizing various functions provided in the multifunction peripheral 1. The functions of the CPU3 include functions of controlling and driving each section of the relay drive circuit 11, a print mechanism, an image reading mechanism (not shown). The CPU3 outputs a set command to the relay drive circuit 11 so as to set the latching relay 12 to the set state, and outputs a reset command to the relay drive circuit 11 so as to set the latching relay 12 to the reset state.

The relay drive circuit 11 outputs a pulse for switching the latching relay 12, based on a command from the CPU 3. Specifically, if the set command is inputted from the CPU 3, the relay drive circuit 11 outputs a setting pulse (set pulse) to the S/R coil section 14 of the latching relay 12 so as to set the latching relay 12 to the set state. If the reset command is inputted from the CPU 3, the relay drive circuit 11 outputs a resetting pulse (reset pulse) to the S/R coil section 14 of the latching relay 12 so as to set the latching relay 12 to the reset state.

The power saving chip 7 is an IC (semiconductor integrated circuit) including a startup detecting section 15, a RTC (real time clock) 16, a power-supply controlling section 17. The startup detecting section 15 has a function of detecting whether the power button switch 31 is operated, as well as a function of detecting switch timing of an operational mode described later (especially, switch (return) timing from the OFF mode to the normal mode). The RTC 16 keeps and outputs the current time. The power-supply controlling section 17 outputs the power-supply oscillation stop/start pulse signal to the oscillation controlling section 42 of the power supply board 40, based on a command from the CPU 3 or on a command from the startup detecting section 15. The power saving chip 7 operates by using the second DC power-supply voltage V2 supplied from the switching power supply 41 or power supplied from the backup power supply 8.

The voltage transforming section 9 transforms the second DC power-supply voltage V2 supplied from the switching power supply 41 or voltage supplied from the backup power supply 8 (approximately 5V) into operation detecting voltage Vb of 3.3V. The operation detecting voltage Vb is applied to the other end of the resistance R1. As described earlier, one end of the resistance R1 is connected to the power button switch 31 and is also connected to the startup detecting section 15 in the power saving chip 7. That is, voltage at the one end of the resistance R1 is inputted to the startup detecting section 15 as a switch operational signal Ps.

With this configuration, when the power button switch 31 is not pressed, the operation detecting voltage Vb of 3.3V is inputted to the startup detecting section 15 via the resistance R1. That is, the switch operational signal Ps of 3.3V is inputted to the startup detecting section 15. On the other hand, when the power button switch 31 is pressed, the one end of the resistance R1 is connected to the ground line via the power button switch 31, so that the switch operational signal Ps becomes 0V.

The startup detecting section 15 detects that the power button switch 31 is pressed, based on a voltage change of the inputted switch operational signal Ps. And, each time a pressing operation of the power button switch 31 is detected, the startup detecting section 15 switches the operational mode of the multifunction peripheral 1 as will be described later.

Here, the operational mode of the multifunction peripheral 1 will be described. The multifunction peripheral 1 of the present embodiment has the normal mode and the OFF mode as the operational modes. The normal mode is an operational mode in which the switching power supply 41 supplies each section in the multifunction peripheral 1 with respective DC power-supply voltages V1, V2, and V3, so that each section in the multifunction peripheral 1 becomes operable. In the normal mode, the switching power supply 41 supplies the main board 10 with respective DC power-supply voltages V1, V2, and V3. Of these, at least the third power-supply voltage V3 of 3.3V is also supplied to the communication circuit board 20.

Hence, in the normal mode, the CPU 3 in the main board 10 operates so as to be able to perform various functions of the multifunction peripheral 1. In the communication circuit board 20, each circuit such as the DAA 21, the modem 22, and so on become operable, so that communications such as voice telephone call, facsimile communication, and so on through the telephone network can be performed. Hence, in the normal mode, when polarity of the telephone network reverses at the time of incoming voice telephone call, for example, the DAA 21 detects the polarity reversion and keeps a line closed state. And, under controls by the CPU 3, a voice telephone call with a caller is enabled subsequent to various operations such as emitting a ringing tone, transmitting an answer signal to the line.

In the normal mode, the second DC power-supply voltage V2 supplied from the switching power supply 41 is inputted to the power saving chip 7 and the voltage transforming section 9 via a diode D1. Hence, in the normal mode, the power saving chip 7 and the voltage transforming section 9 operate by using the second DC power-supply voltage V2 supplied from the switching power supply 41.

On the other hand, the OFF mode is an operational mode that is set at a standby time in which the multifunction peripheral 1 is not used for a certain period, that is set when the user presses the power button switch 31 in the normal mode, or the like. And, the OFF mode is an operational mode in which oscillation of the switching power supply 41 is stopped so that supplying of each of the DC power-supply voltages V1, V2, and V3 is stopped (each of the DC power-supply voltages V1, V2, and V3 becomes 0V). Because oscillation of the switching power supply 41 completely stops, standby power in the OFF mode is almost zero. Because the OFF mode is provided, the multifunction peripheral 1 of the present embodiment can achieve very high level power saving.

In the normal mode, the CPU3 constantly detects whether an OFF-mode switch condition for switching the operational mode to the OFF mode is satisfied. In the present embodiment, the OFF-mode switch condition includes, for example, that the multifunction peripheral 1 is not used for a certain period, that the power button switch 31 is pressed, and the like. The CPU 3 uses various pieces of information such as time information from the RTC 16, the switch operational signal Ps, and so on to detect whether the OFF-mode switch condition is satisfied. If the OFF-mode switch condition is satisfied, the CPU 3 controls the power-supply controlling section 17 to output the power-supply oscillation stop/start pulse signal. When the power-supply controlling section 17 outputs the power-supply oscillation stop/start pulse signal in the normal mode, the oscillation controlling section 42 in the power supply board 40 controls the switching power supply 41 to stop oscillation. With this operation, the operational mode is switched from the normal mode to the OFF mode.

In the OFF mode, because oscillation of the switching power supply 41 is stopped, most circuits in the multifunction peripheral 1 such as the CPU 3, the DAA 21, and the modem 22 stop without power supply. Hence, power consumption can be further reduced, compared with the conventional sleep mode.

However, some functions need to be maintained even in the OFF mode (hereinafter referred to as "minimum basic functions"). Examples of the minimum basic functions are the RTC 16, detection of an operation of the power button switch 31, the startup detecting section 15 that detects a return condition for cancelling the OFF mode and returning to the normal mode, the power-supply controlling section 17 that outputs the power-supply oscillation stop/start pulse signal for oscillating the switching power supply 41 at the time of cancelling the OFF mode, and the like. That is, even in the OFF mode, operations of each section in the power saving chip 7 and detection of an operation of the power button switch 31 need to be maintained at least.

Thus, in the present embodiment, the backup power supply 8 is provided for maintaining these minimum basic functions even in the OFF mode. Various specific configurations of the backup power supply 8 can be conceived. In the present embodiment, a supercapacitor C0 is used as the backup power supply 8.

In the normal mode, the supercapacitor C0 is supplied with the second DC power-supply voltage V2 of 5V from the switching power supply 41, and thus charged to 5V. In the OFF mode, charged power of the supercapacitor C0 is supplied to the power saving chip 7 and the voltage transforming section 9 as backup power, so that the power saving chip 7 and the voltage transforming section 9 become operable, thereby maintaining the minimum basic functions.

In the present embodiment, the return condition for returning the operational mode from the OFF mode to the normal mode includes that the power button switch 31 is pressed, that charging voltage of the supercapacitor C0 becomes lower than or equal to a particular lower limit voltage, that the OFF mode continues for a certain period, and the like.

Specifically, if the power button switch 31 is pressed in the OFF mode, the switch operational signal Ps inputted to the startup detecting section 15 changes from High level (3.3V) to Low level (0V). When the startup detecting section 15 detects the change of the switch operational signal Ps, the startup detecting section 15 causes the power-supply controlling section 17 to output the power-supply oscillation stop/start pulse signal so that the operational mode is returned to the normal mode.

If the OFF mode continues for a certain period, the operational mode is temporarily returned to the normal mode to perform a particular process such as a cleaning process of the print mechanism, for example. The startup detecting section 15 determines whether the OFF mode continues for a certain period, based on time information of the RTC 16. If the OFF mode continues for a certain period, the power-supply controlling section 17 outputs the power-supply oscillation stop/start pulse signal so that the operational mode is returned to the normal mode. If the operational mode is returned to the normal mode after the OFF mode continues for a certain period, the CPU 3 performs a particular necessary process and subsequently switches the operational mode to the OFF mode.

If the charging voltage of the supercapacitor C0 becomes lower than or equal to the lower limit voltage in the OFF mode, the operational mode is temporarily returned to the normal mode so that oscillation of the switching power supply 41 is restarted for charging the supercapacitor C0. The startup detecting section 15 monitors the charging voltage of the supercapacitor C0 and, if the charging voltage becomes lower than or equal to the lower limit voltage, causes the power-supply controlling section 17 to output the power-supply oscillation stop/start pulse signal, so that the operational mode is returned from the OFF mode to the normal mode. Cancellation of the OFF mode in this case is cancellation for replenishing charging power of the supercapacitor C0. Hence, although the OFF mode is cancelled temporarily, once the supercapacitor C0 is charged to a certain level, the CPU 3 again switches the operational mode to the OFF mode.

Note that other various configurations can be adopted as the backup power supply 8. For example, the backup power supply 8 may include an AC direct small-capacity power supply, a combination of a supercapacitor and the AC direct small-capacity power supply, a secondary battery, or the like.

The AC direct small-capacity power supply is a power-supply circuit that is provided separately from the switching power supply 41 and that generates a backup power supply voltage (DC 5V in this example) from external commercial AC power supply and supplies the generated voltage to the power saving chip 7 and the voltage transforming section 9. The AC direct small-capacity power supply can be constituted by, for example, a fairly simple circuit including a rectifier circuit having a diode bridge, a zener diode, a smoothing capacitor, and the like. The AC direct small-capacity power supply can constantly generate a backup power supply voltage as long as commercial AC power is inputted.

In a case where the backup power supply 8 is constituted by the above-described AC direct small-capacity power supply, due to this configuration, backup power needed for maintaining the minimum basic functions can be obtained directly from the commercial AC power supply even in the OFF mode.

In a case where the backup power supply 8 is a combination of the supercapacitor C0 and the AC direct small-capacity power supply, a high-performance backup power supply circuit can be achieved because both power from the supercapacitor C0 and power from the AC direct small-capacity power supply exist as backup power. In a case where the backup power supply 8 is a combination of the supercapacitor C0 and the AC direct small-capacity power supply, the supercapacitor C0 is charged by the AC direct small-capacity power supply even in the OFF mode. Hence, there is no such case that the OFF mode is temporarily cancelled due to low charging voltage of the supercapacitor C0 in the OFF mode, like the case where the backup power supply 8 is constituted only by the supercapacitor C0.

In the multifunction peripheral 1 having the OFF mode as an operational mode of the present embodiment, when the operational mode becomes the OFF mode, power supply from the switching power supply 41 is cut off and hence the operations of the DAA 21, the modem 22, and so on stop in the communication circuit board 20. Hence, in the OFF mode, the DAA 21 cannot detect a network event (telephone-network event) even when an electrical change (network event) occurs in the telephone network originating from control operations and so on of the telephone network side (switch board and so on), such as polarity reversion of the telephone network, an input of a call signal, or the like.

Thus, the multifunction peripheral 1 of the present embodiment includes a network-event detecting circuit (telephone-network-event detecting circuit) having the photo coupler 24, so that a network event can be detected even in the OFF mode to return to the normal mode. The network-event detecting circuit is mainly constituted by the light emitting diode unit 25 connected between the pair of network connection lines L11 and L12, the circuit in which the photo transistor 26 and the latching relay 12 are connected in series, and the like. Here, the circuit in which the photo transistor 26 and the latching relay 12 are connected in series is connected to the power button switch 31 in parallel as described above.

Further, in the present embodiment, the CPU 3 sets the latching relay 12 to the set state when the operational mode is switched to the OFF mode, and sets the latching relay 12 to the reset state when the operational mode is returned from the OFF mode to the normal mode. The CPU 3 controls the relay drive circuit 11 to output a pulse, thereby switching the latching relay 12. As described earlier, the state of the latching relay 12 shown in FIG. 1 shows the set state, that is, a state in which the operational mode is the OFF mode.

With this configuration, for example, when polarity reversion of the telephone network occurs in the OFF mode as a network event, a current flows through the light emitting diode unit 25 and one of the light emitting diodes emits light, which causes the photo transistor 26 to turn on. Then, the one end of the resistance R1 is connected to the ground line of the panel board 30 via the latching relay 12 and the photo transistor 26, and hence voltage of the one end of the resistance R1 becomes 0V.

This state is a state in which the both ends of the power button switch 31 are electrically connected, and is equivalent to a state in which the power button switch 31 is pressed. That is, in the present embodiment, if a network event occurs in the OFF mode, the power button switch 31 is turned on in a pseudo manner (or, equivalently) by turning on the photo transistor 26. When the photo transistor 26 is turned on, the switch operational signal Ps inputted to the startup detecting section 15 becomes 0V. When the switch operational signal Ps becomes 0V in the OFF mode, the startup detecting section 15 determines that the power button switch 31 is pressed and returns the operational mode to the normal mode.

In addition to polarity reversion, for example, when a call signal (AC signal of a particular frequency) is inputted from the telephone network, the call signal causes the light emitting diode unit 25 to emit light and causes the photo transistor 26 to turn on. This state is a state in which the power button switch 31 is pressed in a pseudo manner, and the operational mode returns to the normal mode.

Further, if the line cord 60 is connected to the multifunction peripheral 1 in a state where the line cord 60 is not connected to the multifunction peripheral 1 and the operational mode is the OFF mode, at the time of connection of the line cord 60, a potential difference between the pair of telephone cables L1 and L2 (for example, approximately 48V) causes the light emitting diode unit 25 to emit light, so that the operational mode is returned to the normal mode.

In this way, because the multifunction peripheral 1 of the present embodiment includes the network-event detecting circuit having the photo coupler 24, even in the OFF mode in which the DAA 21 does not operate, a network event can be detected on behalf of the DAA 21 so as to return to the normal mode. After returning to the normal mode, the DAA 21 operates and detects a network event so that a voice telephone call, facsimile communication, and so on can be performed with the telephone network side.

On the other hand, after returning to the normal mode, if the network-event detecting circuit was in the same state as the OFF mode, this operation of the network-event detecting circuit would cause unnecessary switching of the operational mode. That is, if a network event occurred in a state where the operational mode is the normal mode, the DAA 21 would detect the network event and perform a particular process and, in parallel with that, the photo coupler 24 would operate to turn on the photo transistor 26 and to turn on the power button switch 31 in a pseudo manner. Then, the startup detecting section 15 would determine that the power button switch 31 is turned on, and switch the operational mode from the normal mode to the OFF mode. That is, in the normal mode, each time a network event occurs, the power button switch 31 would be turned on in a pseudo manner and the operational mode would switch.

Hence, in the present embodiment, the latching relay 12 is provided in the network-event detecting circuit, so that the network-event detecting circuit does not operate in the normal mode. That is, the latching relay 12 is set to the set state only in the OFF mode and, if a network event occurs, the power button switch 31 is turned on in a pseudo manner. And, the latching relay 12 is set to the reset state in the normal mode and, even if a network event occurs, the power button switch 31 is not turned on in a pseudo manner.

Note that, in the present embodiment, the latching relay 12 is used for preventing the power button switch 31 from being turned on in a pseudo manner in the normal mode due to a network event. This is merely one example, and another means may be adopted to realize the same function.

For example, instead of the latching relay 12, a normal relay configured to switch in conjunction with energization or no energization in the coil may be adopted. In this case, the switch 13 is in a state shown in FIG. 1 (that is, a state in which the network-event detecting circuit is effective) in no energization state in the OFF mode. In the normal mode, the coil is energized to switch the state of the switch 13 so that the network-event detecting circuit is disabled.

However, if the above-described normal relay is used, the coil of the relay needs to be constantly energized in the normal mode, which increases power consumption in the normal mode. Hence, in order to reduce power consumption in the normal mode as much as possible, it is preferable to use a means that does not need continuous energization in the normal mode, like the configuration including the latching relay 12 in the present embodiment.

A main process executed by the CPU 3 will be described while referring to FIG. 2. Upon starting up with power supply from the switching power supply 41, the CPU 3 reads out a program of the main process shown in FIG. 2 from a memory (not shown) and executes the program. Note that, although the CPU 3 switches the operational mode from the normal mode to the OFF mode by executing the main process in FIG. 2, the CPU 3 does not actively perform switching from the OFF mode to the normal mode. In the OFF mode, the CPU 3 is not supplied with power and is in a stopped state. As described earlier, the power saving chip 7 performs switching from the OFF mode to the normal mode if the return condition is satisfied. If the return condition is satisfied in the OFF mode, the power-supply oscillation stop/start pulse signal is outputted from the power-supply controlling section 17 in the power saving chip 7 to the oscillation controlling section 42, which starts power supply from the switching power supply 41. In the present embodiment, the operational mode in which power is supplied from the switching power supply 41 is defined as the normal mode. Thus, at the time when the CPU 3 has started operations and has started the main process in FIG. 2, the operational mode is already in the normal mode.

Figure 2:
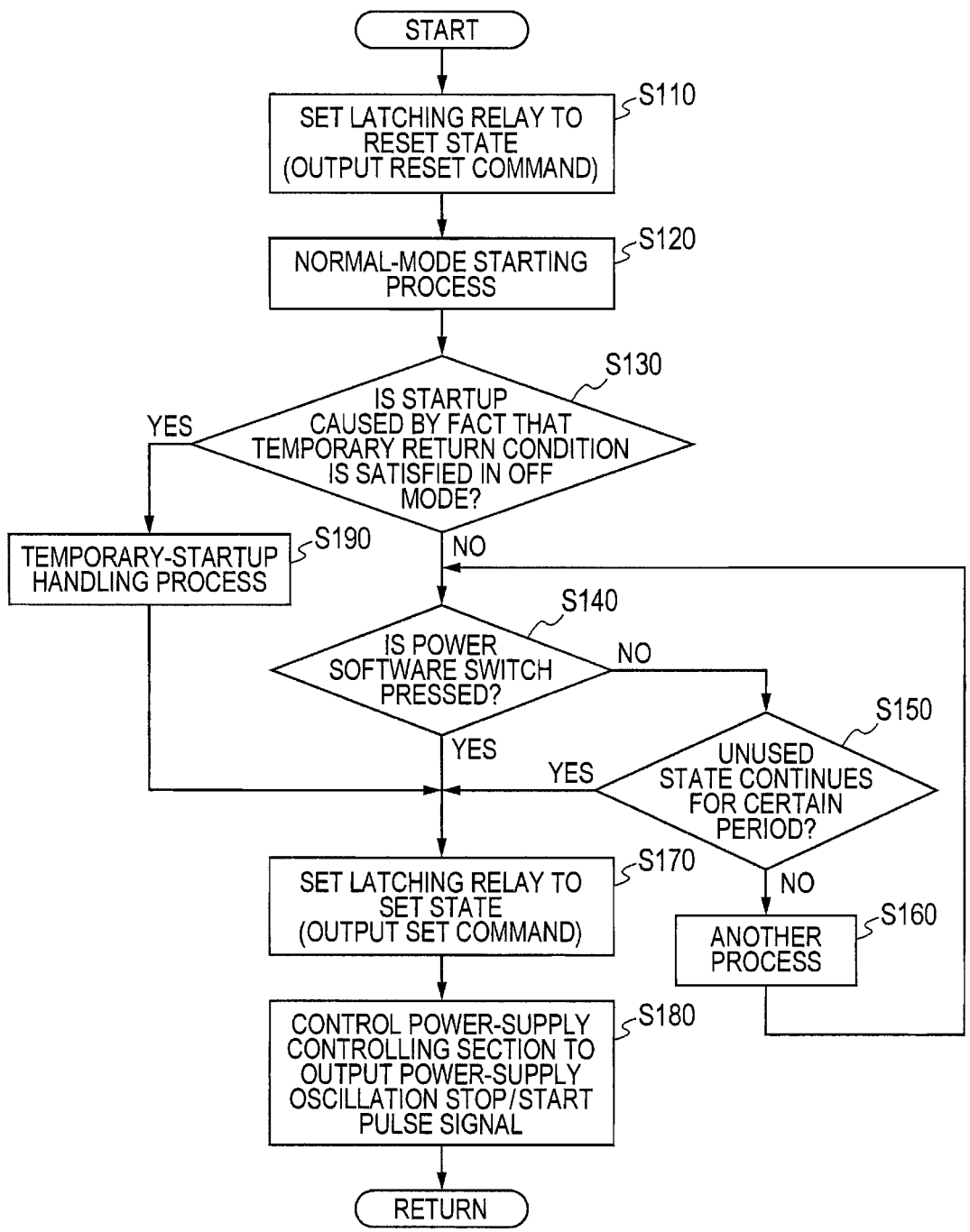
FIG. 2 is a flowchart showing a main process executed by a CPU.
Figure 3:
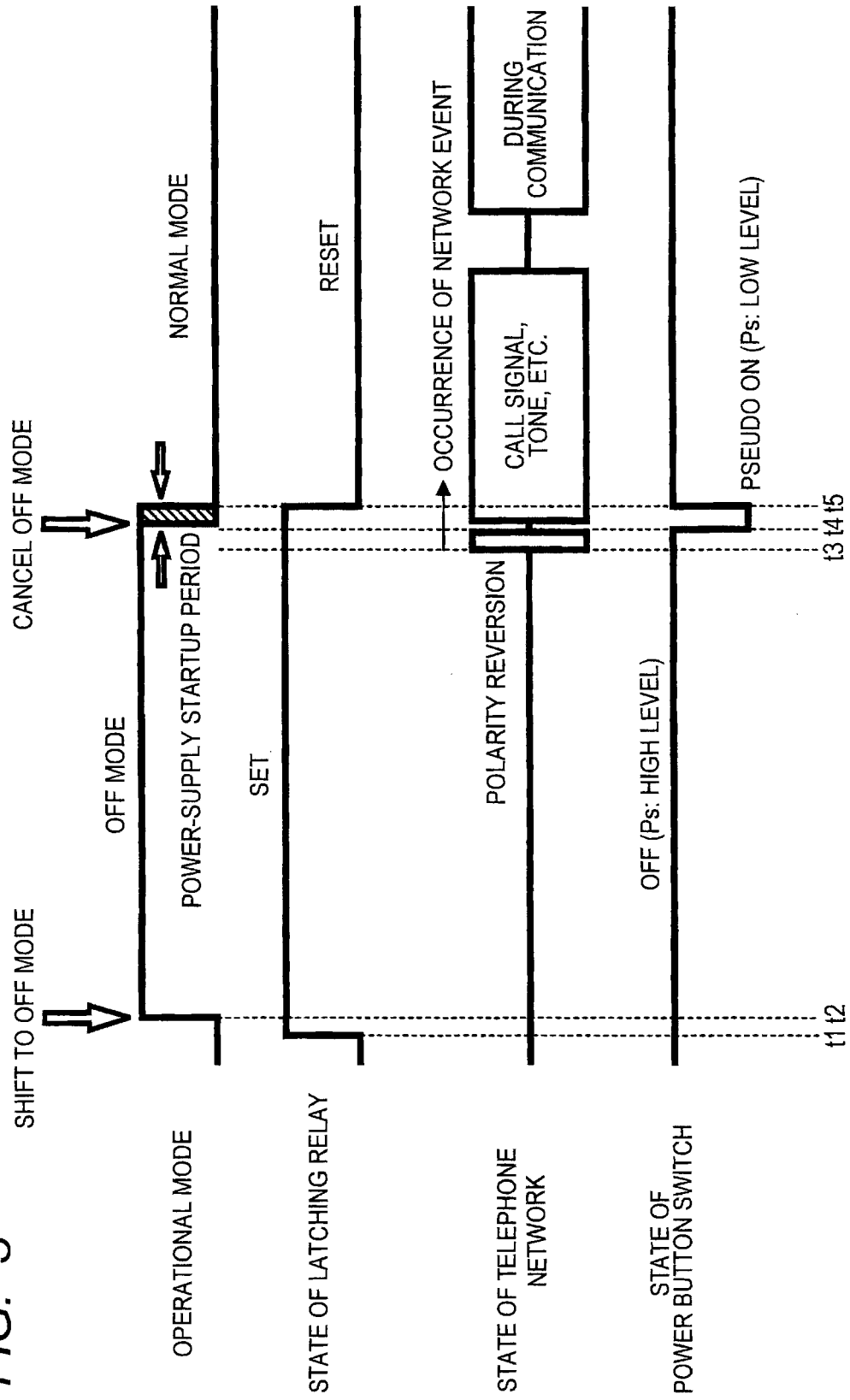
FIG. 3 is a timing chart showing an operational example at the time when a network event (telephone-network event) occurs in the multifunction peripheral according to the embodiment.

Upon starting the main process in FIG. 2, in S110 the CPU 3 outputs a reset command to the relay drive circuit 11 so that the latching relay 12 becomes the reset state. In S120, the CPU 3 executes a normal-mode starting process. The normal-mode starting process is particular several processes that are executed when the CPU 3 starts up.

In S130, the CPU 3 determines whether the startup of the CPU 3 is caused by a fact that a temporary return condition is satisfied in the OFF mode. The temporary return condition is one of facts that the OFF mode continues for a certain period and that the charging voltage of the supercapacitor C0 becomes lower than or equal to the lower limit voltage.

If the startup of the CPU 3 is not caused by a fact that the temporary return condition is satisfied in the OFF mode (S130: No), in S140 the CPU 3 determines whether the power button switch 31 is pressed. If the power button switch 31 is not pressed (S140: No), in S150 the CPU 3 determines whether an unused state continues for a certain period in which the multifunction peripheral 1 is not used. If the unused state does not continue for a certain period (S150: No), in S160 the CPU 3 performs another process (the details are omitted) and returns to S140.

If it is determined that the power button switch 31 is pressed in S140 (S140: Yes) and if it is determined that the unused state continues for a certain period in S150 (S150: Yes), the OFF-mode switch condition is satisfied and thus the CPU 3 performs processes for switching to the OFF mode in S170 and S180.

In S170, the CPU 3 outputs a set command to the relay drive circuit 11 so that the latching relay 12 becomes the set state. In S180, the CPU 3 controls the power-supply controlling section 17 to output the power-supply oscillation stop/start pulse signal. With this operation, the power-supply oscillation stop/start pulse signal is outputted from the power-supply controlling section 17 to the oscillation controlling section 42, so that the switching power supply 41 stops oscillation and the operational mode shifts to the OFF mode.

In S130, if the startup of the CPU 3 is caused by a fact that the temporary return condition is satisfied in the OFF mode (S130: Yes), the CPU 3 proceeds to S190 and executes a temporary-startup handling process. The temporary-startup handling process is preliminarily determined, depending on which temporary return condition has caused the operational mode to switch from the OFF mode to the normal mode. For example, if the operational mode switches to the normal mode because the OFF mode continues for a certain period, the temporary-startup handling process is a particular process such as a cleaning process of the print mechanism or the like. If the operational mode switches to the normal mode because the charging voltage of the supercapacitor C0 is lower than or equal to the lower limit voltage, the temporary-startup handling process is charging the supercapacitor C0 to a certain level. Upon finishing the temporary-startup handling process in S190, the CPU 3 proceeds to S170.

Next, out of operations of the multifunction peripheral 1 in the present embodiment, an operational example will be described while referring to FIG. 3 in which the operational mode switches to the normal mode due to occurrence of a network event in the OFF mode. If the OFF-mode switch condition is satisfied in the normal mode, the CPU 3 performs a process needed prior to switching to the OFF mode and sets the latching relay 12 (t1). With this operation, the operational mode shifts to the OFF mode (t2).

After shifting to the OFF mode, if a network event such as polarity reversion occurs (t3), the photo coupler 24 operates to turn on the photo transistor 26 and to turn on the power button switch 31 in a pseudo manner, and the switch operational signal Ps inputted to the power saving chip 7 changes from the High level (3.3V) to the Low level (0V) (t4). With this operation, the power-supply controlling section 17 of the power saving chip 7 outputs the power-supply oscillation stop/start pulse signal to the power supply board 40 so as to oscillate the switching power supply 41. The switching power supply 41 oscillates to output each of the DC power-supply voltages V1, V2, and V3, thereby cancelling the OFF mode and returning to the normal mode (t5).

According to the multifunction peripheral 1 of the above-described present embodiment, a network event is detected by the network-event detecting circuit having the photo coupler 24 and so on in the OFF mode in which power is not supplied to the DAA 21 and, if a network event occurs, the power button switch 31 is turned on in a pseudo manner so as to return the operational mode to the normal mode. This achieves the OFF mode in which the operation of the switching power supply 41 is completely stopped to make power consumption approximately zero and it is very effective in terms of power saving, while maintaining a state in which a network event can be detected even in the OFF mode.

If a configuration has a function of shifting to the OFF mode but a network event cannot be detected in the OFF mode, a user who puts emphasis on communication function through the telephone network cannot use that OFF mode. Who can use this OFF mode is limited to users who have no problem with being unable to detect a network event, such as users who do not use communication function through the telephone network.

In contrast, because the multifunction peripheral 1 of the present embodiment can detect a network event even in the OFF mode, the user who puts emphasis on communication function through the telephone network can use the OFF mode without any problem. That is, the OFF mode can be introduced easily and effectively into the multifunction peripheral 1 having a telephone function and a facsimile communication function.

Further, in the OFF mode, the minimum operations of the power saving chip 7, the voltage transforming section 9, and the like are continued by the backup power supply 8. Hence, in the OFF mode, although power supply from the switching power supply 41 is cut off, switching from the OFF mode to the normal mode can be reliably performed by the backup power supply 8. Also, power need not be supplied to the power saving chip 7 and the voltage transforming section 9 from the switching power supply 41, which improves an effect of power saving in the OFF mode.

Further, as a method of conveying a network event to the power saving chip 7 when the network event is detected, the network-event detecting circuit is connected in parallel to the power button switch 31 so that the power button switch 31 is turned on in a pseudo manner when the network event occurs. With this simple configuration, switching to the normal mode can be reliably performed when the network event is detected.

Further, the multifunction peripheral 1 of the present embodiment includes the latching relay 12, thereby preventing the power button switch 31 from being turned on in a pseudo manner due to occurrence of a network event in the normal mode. That is, in the normal mode, the operation of the network-event detecting circuit is disabled. This prevents a situation in which, in the normal mode, the power button switch 31 is turned on in a pseudo manner and the operational mode is switched each time a network event occurs.

In addition, due to the latching relay 12, although energization (pulse) is needed at the time of switching between the set and reset states, no energization is needed other than that time. Hence, disablement of the network-event detecting circuit in the normal mode can be achieved at lower power consumption.

In the present embodiment, the DAA 21 serves as one example of the network connecting section. The switching power supply 41 serves as one example of the main power supply. The circuit leading from the resistance R1 to the ground line in the panel board 30 via the latching relay 12 and the photo coupler 24 serves as one example of the operational-switch conduction circuit. The power saving chip 7 serves as one example of the normal mode setter. The backup power supply 8 serves as one example of the backup power supply. The power button switch 31 serves as one example of the operational switch.

[Modifications]

While the invention has been described in detail with reference to the above aspects thereof, it would be apparent to those skilled in the art that various changes and modifications may be made therein without departing from the scope of the claims.

(1) In the above-described embodiment, the photo coupler 24 is used as a means for detecting a network event, as an example. Instead of the photo coupler 24, for example, a photo MOS relay may be used. Various circuit configurations or elements may be used as long as the primary side (the telephone network side) is galvanically isolated from the secondary side, and occurrence of a network event can be transmitted to the secondary side.

(2) In the above-described embodiment, as a method of conveying occurrence of a network event in the OFF mode to the power saving chip 7, the network-event detecting circuit is provided in parallel to the power button switch 31 so that the power button switch 31 is tuned on in a pseudo manner, which is one example. Various methods may be adopted as long as occurrence of a network event can be conveyed to the startup detecting section 15 of the power saving chip 7.

(3) In the above-described embodiment, the invention is applied to the multifunction peripheral 1. However, it goes without saying that the invention is not limited to the multifunction peripheral 1. The invention may be applied to various kinds of communication apparatuses that are connected to the telephone network for use.

What is claimed is:

1. A communication apparatus connectable to a telephone network, comprising:
    a network connecting section configured to operate by using operational power and connected to the telephone network to perform transmission and reception of signals through the telephone network;
    a main power supply configured to supply a supply target including the network connecting section with the operational power;
    a backup power supply that is provided separately from the main power supply and that is configured to supply backup power of a particular voltage;
    a network-event detector configured to detect an electrical change in the telephone network as a network event;
    a normal-mode setter configured to set an operational mode to a normal mode when the network-event detector detects the network event in a state where the operational mode is in a stopped mode, the normal mode being the operational mode in which the operational power is supplied from the main power supply to the network connecting section, the stopped mode being the operational mode in which supply of the operational power to the network connecting section is stopped, where the network-event detector and the normal-mode setter are configured to operate by using the backup power supplied from the backup power supply when the operational mode is in the stopped mode; and
    an operational-signal outputting section configured to receive an input operation for starting up or stopping the communication apparatus and configured to output, to the normal-mode setter, an operational signal indicating that the input operation is received,
    wherein the operational-signal outputting section is configured to operate by using the backup power supplied from the backup power supply when the operational mode is in the stopped mode;
    wherein the normal-mode setter is configured to set the operational mode to the normal mode when the operational signal is inputted in a state where the operational mode is in the stopped mode, and
    wherein, upon detecting the network event, the network-event detector is configured to generate the operational signal and to output the operational signal to the normal-mode setter,
    wherein the communication apparatus further comprises:
    an operational-signal cut-off section configured to prevent the network-event detector from outputting the operational signal to the normal-mode setter when the operational mode is in the normal mode.

2. The communication apparatus according to claim 1, wherein the stopped mode is the operational mode in which the supply of the operational power from the main power supply to the supply target is stopped; and
    wherein the normal mode is the operational mode in which the supply of the operational power from the main power supply to the supply target is performed.

3. The communication apparatus according to claim 1, wherein the operational-signal cut-off section comprises a latching relay configured to cut off a transmission path of the operational signal leading from the network-event detector to the normal-mode setter.

4. The communication apparatus according to claim 3, wherein the operational-signal cut-off section is configured to set the latching relay such that the transmission path is cut off when the normal-mode setter sets the operational mode to the normal mode.

5. The communication apparatus according to claim 1, wherein the network-event detector comprises a photo coupler having a light emitting element and a light receiving element that are electrically isolated from each other; and
    wherein the network-event detector is configured to generate the operational signal when the light emitting element emits light due to the electrical change in the telephone network and the light receiving element receives the light.

6. The communication apparatus according to claim 1, wherein the operational-signal outputting section comprises an operational switch configured to be ON while the input operation is performed and to be OFF while no input operation is performed, the operational-signal outputting section being configured to output the operational signal while the operational switch is ON; and
    wherein the network-event detector comprises an operational-switch connection circuit that is connected in parallel to the operational switch and that is configured to, upon detecting the network event, connect both ends of the operational switch to equivalently turn the operational switch ON so that the operational-signal outputting section outputs the operational signal.

7. The communication apparatus according to claim 1, further comprising:
- a stopped-mode setter configured to set the operational mode to the stopped mode when a particular stopping condition is satisfied in the normal mode.

8. The communication apparatus according to claim 7, wherein the main power supply is configured to stop supplying of the operational power when a stop signal is inputted in the normal mode; and
- wherein the stopped-mode setter is configured to output the stop signal to the main power supply to change the operational mode from the normal mode to the stopped mode.

9. The communication apparatus according to claim 1, wherein the main power supply is configured to be allowed to supply the operational power when a start signal is inputted in the stopped mode; and
- wherein the normal-mode setter is configured to output the start signal to the main power supply to change the operational mode from the stopped mode to the normal mode.

\* \* \* \* \*